United States Patent
Farooq et al.

(10) Patent No.: US 12,508,891 B2
(45) Date of Patent: Dec. 30, 2025

(54) DEPLOYABLE VEHICLE BRACE

(71) Applicant: Ford Global Technologies, LLC, Dearborn, MI (US)

(72) Inventors: S.M. Iskander Farooq, Novi, MI (US); Mohammad Omar Faruque, Ann Arbor, MI (US); Dean M. Jaradi, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 283 days.

(21) Appl. No.: 18/326,191

(22) Filed: May 31, 2023

(65) Prior Publication Data

US 2024/0399844 A1    Dec. 5, 2024

(51) Int. Cl.
 B60K 1/04    (2019.01)
(52) U.S. Cl.
 CPC ........ B60K 1/04 (2013.01); *B60K 2001/0438* (2013.01)
(58) Field of Classification Search
 CPC ............. B60K 1/04; B60K 2001/0438; H01M 2220/20
 See application file for complete search history.

(56) References Cited

U.S. PATENT DOCUMENTS

| 11,352,064 | B2* | 6/2022 | Choi ...................... B60K 1/04 |
| 11,491,948 | B2 | 11/2022 | Jaradi et al. |
| 2022/0363143 | A1 | 11/2022 | Faruque et al. |
| 2022/0388466 | A1 | 12/2022 | Jaradi et al. |

FOREIGN PATENT DOCUMENTS

| CN | 106347094 A | 1/2017 |
| DE | 102010050826 A1 | 5/2012 |

\* cited by examiner

*Primary Examiner* — Jason D Shanske
*Assistant Examiner* — James J Triggs
(74) *Attorney, Agent, or Firm* — Frank A. MacKenzie; Brooks Kushman P.C.

(57) ABSTRACT

An assembly including a vehicle battery tray. The assembly includes a track fixed relative to the vehicle battery tray. The track is elongated along a cross-vehicle axis. The assembly includes a brace slideably engaged with the track. The brace is slidable along the track relative to the vehicle battery tray along the cross-vehicle axis in a vehicle-outboard direction from an undeployed position to a deployed position. The assembly includes a pyrotechnic actuator operatively coupled to the brace to slide the brace along the track from the undeployed position to the deployed position.

20 Claims, 8 Drawing Sheets

DEPLOYABLE VEHICLE BRACE

BACKGROUND

A battery-electric vehicle includes one or more batteries that power the vehicle, including propulsion of the vehicle. For example, wheels of the vehicle are powered by electric motors that are powered by the batteries. The battery is stored in a battery compartment, e.g., a battery tray that may be, for example, under a passenger compartment of the vehicle. In such an example, the battery compartment may span the entire cross-vehicle width of the vehicle underbody.

DETAILED DESCRIPTION

An assembly including a vehicle battery tray. The assembly includes a track fixed relative to the vehicle battery tray. The track is elongated along a cross-vehicle axis. The assembly includes a brace slideably engaged with the track. The brace is slidable along the track relative to the vehicle battery tray along the cross-vehicle axis in a vehicle-outboard direction from an undeployed position to a deployed position. The assembly includes a pyrotechnic actuator operatively coupled to the brace to slide the brace along the track from the undeployed position to the deployed position.

The assembly may include a second track fixed relative to the vehicle battery tray and spaced along a vehicle-longitudinal axis from the track. The second track may be elongated along the cross-vehicle axis and the brace may be slidably engaged with the second track.

The brace may include a vehicle-longitudinal portion elongated along the vehicle-longitudinal axis and a pair of cross-vehicle portions fixed to the vehicle-longitudinal portion. One of the cross-vehicle portions may be slidably engaged with the track and the other of the cross-vehicle portions may be slidably engaged with the second track.

The assembly may include a lock fixed to each of the track and the second track. The brace may be lockable relative to the track and the second track by the locks when the brace is in the deployed position.

The locks may be spring loaded.

The assembly may include a second pyrotechnic actuator operatively coupled to the brace. The brace may be slidable along the track and the second track by the pyrotechnic actuator and the second pyrotechnic actuator.

The assembly may include a second pyrotechnic actuator operatively coupled to the brace. The brace may be slidable relative to the vehicle battery tray by the pyrotechnic actuator and the second pyrotechnic actuator.

The assembly may include airbag supported by the brace. The airbag may be inflatable from an uninflated position to the inflated position. The airbag may be in the uninflated position when the brace is in the undeployed position and the airbag may be in the inflated position when the brace is in the deployed position.

The brace may include a vehicle-longitudinal portion elongated along a vehicle-longitudinal axis and a pair of cross-vehicle portion fixed to the vehicle-longitudinal portion. The cross-vehicle portions may be spaced from each other along the vehicle-longitudinal portion.

The vehicle-longitudinal portion may include a beam elongated along the vehicle-longitudinal axis and a truss fixed to the beam. The truss may be between the cross-vehicle portions along the beam.

The assembly may include a second track fixed relative to the vehicle battery tray. The second track may be spaced from the track and elongated along the cross-vehicle axis. The assembly may include a second brace slideably engaged with the second track. The second brace may be slidable along the second track relative to the vehicle battery tray along the cross-vehicle axis from an undeployed position to a deployed position. The second brace may be slidable in a vehicle-outboard direction opposite from the brace. The assembly may include a second pyrotechnic actuator operatively coupled to the second brace to slide the second brace along the second track from the undeployed position to the deployed position.

The assembly may include a computer including a processor and a memory storing instructions executable by the processor to detect a certain vehicle impact to a first vehicle side, based on detection of a certain vehicle impact to the first vehicle side, slide the brace to the deployed position, and, based on sliding the brace to the deployed position, inflate an airbag supported by the brace to an inflated position.

The instructions may include detect a certain vehicle impacts to a second vehicle side, based on detection of a certain vehicle impact to the second vehicle side, slide the second brace to the deployed position, and, based on sliding the second brace to the deployed position, inflate an airbag supported by the second brace to an inflated position.

The assembly may include a computer including a processor and a memory storing instructions executable by the processor to detect a certain vehicle impact, based on detection of a certain vehicle impact, slide the brace to the deployed position, and, based on sliding the brace to the deployed position, inflate an airbag supported by the brace to an inflated position.

A vehicle includes a vehicle frame having a first frame rail and a second frame rail spaced cross-vehicle from the first frame rail. Each of the first frame rail and the second frame rail may be elongated along a vehicle-longitudinal axis. The vehicle includes a vehicle battery tray between the first frame rail and the second frame rail along a cross-vehicle axis. The vehicle includes a vehicle battery supported by the vehicle battery tray. The vehicle includes a track fixed relative to the vehicle battery tray, the track being elongated along a cross-vehicle axis. The vehicle includes a brace slideably engaged with the track. The brace being slidable along the track relative to the vehicle battery tray and the frame rails along the cross-vehicle axis in a vehicle-outboard direction from an undeployed position to a deployed position. The vehicle includes a pyrotechnic actuator operatively coupled to the brace to slide the brace along the track from the undeployed position to the deployed position.

AT least a portion of the brace may be vehicle-inboard of one of the first frame rail and the second frame rail in the undeployed position and at least a portion of the brace may be vehicle-outboard of the one of the first frame rail and the second frame rail in the deployed position.

The vehicle may include a second track fixed relative to the vehicle battery tray. The second track may be spaced from the track and elongated along the cross-vehicle axis. The vehicle may include a second brace slidably engaged with the second track. The second brace may be slidable along the second track relative to the vehicle battery tray and the frame rails along the cross-vehicle axis an undeployed position to a deployed position. The second brace may be slidable in a vehicle-outboard direction opposite from the brace. The brace may be slidable toward one of the first frame rail and the second frame rail to the deployed position and the second brace is slidable toward the other of the first frame rail and the second frame rail.

The vehicle may include a computer including a processor and a memory storing instructions executable by the processor to detect a certain vehicle impact to a first vehicle side, based on detection of a certain vehicle impact to the first vehicle side, slide the brace to the deployed position, and, based on sliding the brace to the deployed position, inflate an airbag supported by the brace to an inflated position.

The instructions may include to detect a certain vehicle impact to a second vehicle side, based on detection of a certain vehicle impact to the second vehicle side, slide the second brace to the deployed position, and, based on sliding the second brace to the deployed position, inflate an airbag supported by the second brace to an inflated position.

The vehicle may include an airbag supported by the brace. The airbag may be inflatable from an uninflated position to the inflated position, the airbag may be in the uninflated position when the brace is in the undeployed position, and the airbag may be in the inflated position when the brace is in the deployed position.

With reference to the Figures, wherein like numerals indicate like parts throughout the several views, an assembly 10 for a vehicle 12 including a vehicle battery tray 14. The assembly 10 includes a track 16 fixed relative to the vehicle battery tray 14. The track 16 is elongated along a cross-vehicle axis A. The assembly 10 includes a brace 18 (hereinafter referred to as "first brace 18") slideably engaged with the track 16. The first brace 18 is slidable along the track 16 relative to the vehicle battery tray 14 along the cross-vehicle axis A in a vehicle-outboard direction VO1 (hereinafter referred to as "first vehicle-outboard direction VO1") from an undeployed position to a deployed position. The assembly 10 includes a pyrotechnic actuator 20 operatively coupled to the first brace 18 to slide the first brace 18 along the track 16 from the undeployed position to the deployed position.

In the event of a certain vehicle impacts, e.g., certain side vehicle impacts, the first brace 18 may slide to the deployed position. As the first brace 18 moves to the deployed position, the first brace 18 slides along the track 16 until the first brace 18 reaches the deployed position. The first brace 18 moves in the first vehicle-outboard direction VO1 toward certain side vehicle impacts. The pyrotechnic actuator 20 activates and slides the first brace 18 in a cross-vehicle direction C in the direction toward certain side vehicle impacts. The pyrotechnic actuator 20 applies a force to the first brace 18 to move the first brace 18 to the deployed position. In the deployed position, the brace 18 may create space between the impacting object and the vehicle battery tray 14 to manage deformation of components of the vehicle, including the brace 18 during impact. The brace 18 in the deployed position transmits forces from the impacting object to the vehicle battery tray 14 to manage and distribute the impacting force.

Figure 1:
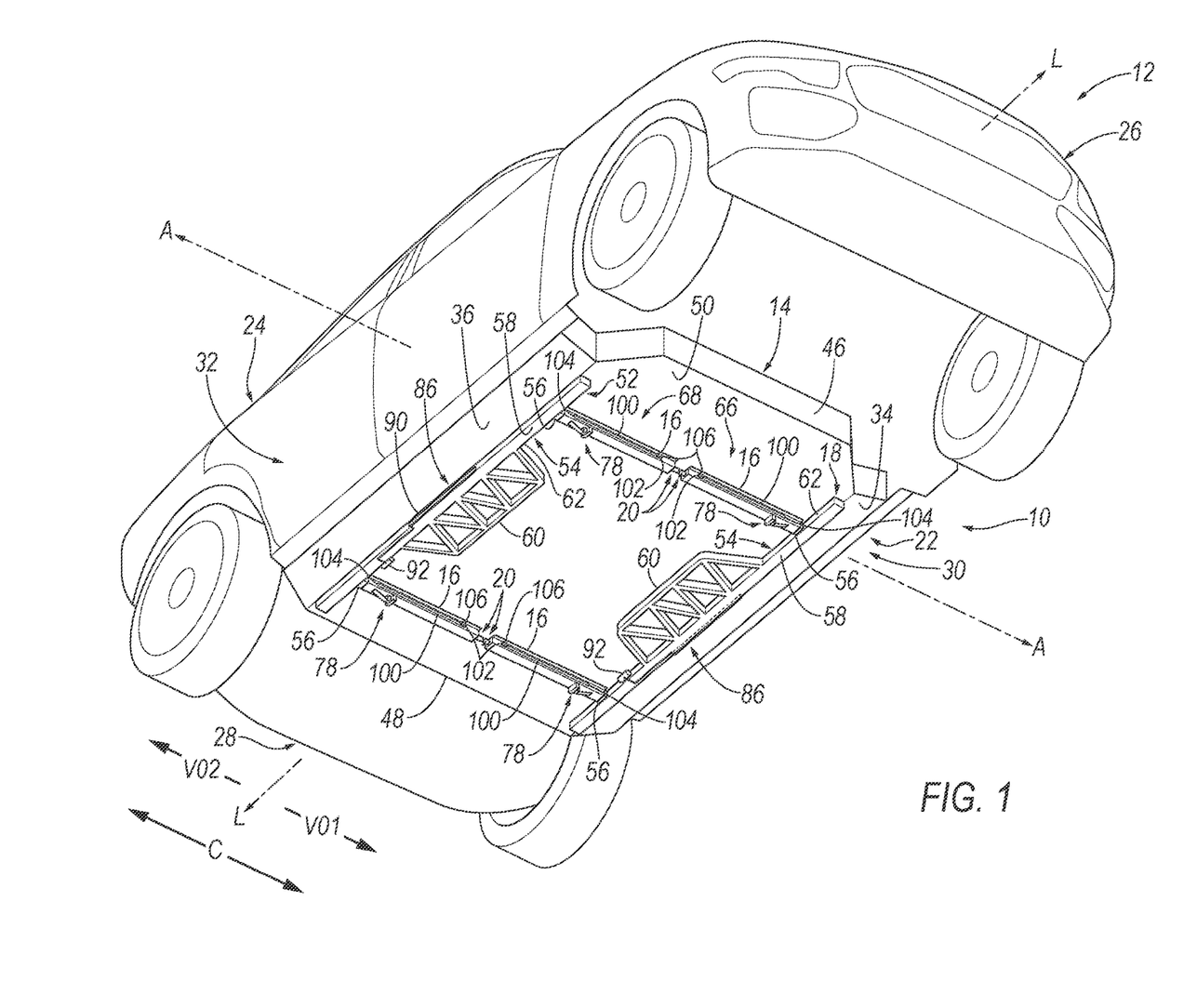
FIG. 1 is a perspective view of an underside of a vehicle having a pair of braces supported by a vehicle battery tray in undeployed positions.

With reference to FIG. 1, the vehicle 12 may be any suitable type of automobile, e.g., a passenger or commercial automobile such as a sedan, a coupe, a truck, a sport utility, a crossover, a van, a minivan, a taxi, a bus, etc. Operations, systems, and methods described herein should always be implemented and/or performed in accordance with an applicable owner's/user's manual and/or safety guidelines.

The vehicle 12 includes a vehicle frame 22. The vehicle frame 22 may be of a unibody construction in which the vehicle frame 22 is unitary with a vehicle body 24 (including frame rails, pillars, roof rails, etc.). As another example, the vehicle body 24 and the vehicle frame 22 may have a body-on-frame construction (also referred to as a cab-on-frame construction) in which the vehicle body 24 and the vehicle frame 22 are separate components, i.e., are modular, and the vehicle body 24 is supported on and affixed to the vehicle frame 22. Alternatively, the vehicle frame 22 and the vehicle body 24 may have any suitable construction. The vehicle frame 22 and the vehicle body 24 may be of any suitable material, for example, steel, aluminum, and/or fiber-reinforced plastic, etc.

The vehicle 12 defines a vehicle-longitudinal axis L extending between a front vehicle end 26 and a rear vehicle end 28 of the vehicle 12. The vehicle 12 defines the cross-vehicle axis A extending cross-vehicle from a first side 30 to a second side 32 of the vehicle 12. A cross-vehicle direction C is parallel to the cross-vehicle axis A. A first vehicle-outboard direction VO1 and a second vehicle-outboard direction VO2 opposite the first vehicle-outboard direction VO1 are each parallel with the cross-vehicle axis A. The first vehicle-outboard direction VO1 and the second vehicle-outboard direction VO2 are opposite each other in the cross-vehicle direction C. For example, one of the first vehicle-outboard direction VO1 and the second vehicle-outboard direction VO2 may be toward the first side 30 of the vehicle 12 and the other of the first vehicle-outboard direction VO1 and the second vehicle-outboard direction VO2 may be toward the second side 32 of the vehicle 12. The vehicle-longitudinal axis L and the cross-vehicle axis A are perpendicular relative to each other.

The vehicle 12 defines a passenger compartment (not shown) to house occupants, if any, of the vehicle 12. The passenger compartment may extend across the vehicle 12, i.e., from the first side 30 to the second side 32 of the vehicle 12. The passenger compartment includes a front end (not numbered) and a rear end (not numbered) with the front end being in front of the rear end during forward movement of the vehicle 12.

The vehicle frame 22 includes a plurality of rails and/or members. Specifically, the vehicle frame 22 includes a first frame rail 34 and a second frame rail 36. The first frame rail 34 and the second frame rail 36 may be hollow. As an example, the first frame rail 34 and the second frame rail 36 may be hydroformed.

The first frame rail 34 and the second frame rail 36 are spaced from each other in the cross-vehicle direction C. i.e., along the cross-vehicle axis A. Specifically, the first frame rail 34 and the second frame rail 36 may define the vehicle-outboard boundaries of the vehicle frame 22. The first frame rail 34 may be elongated along the first side 30 of the vehicle 12 and the second frame rail 36 may be elongated along the second side 32 of the vehicle 12. The first frame rail 34 and the second frame rail 36 may be aligned cross-vehicle with wheel wells and wheels of the vehicle 12, i.e., extending from one wheel well to another wheel well on a common side of the vehicle 12. The first frame rail 34 and the second frame rail 36 are elongated along the vehicle-longitudinal axis L. The first frame rail 34 and the second frame rail 36 may be elongated at least from one wheel well to another wheel well. In addition, the first frame rail 34 and the second frame rail 36 may extend forward of a front wheel well (not numbered) and rearward of a rear wheel well (not numbered), e.g., by extending inboard and/or above the wheel well.

The vehicle 12 may include rockers (not numbered) elongated along the vehicle-longitudinal axis L below doors of the vehicle 12 and the first frame rail 34 and the second frame rail 36 may be adjacent the rockers, respectively. The rockers may be fixed to and/or supported by the first frame rail 34 and the second frame rail 36, respectively. The vehicle battery tray 14 is disposed between the first frame rail 34 and the second frame rail 36 along the cross-vehicle axis A.

The vehicle frame 22 includes at least one cross-member (not numbered) extending from the first frame rail 34 to the second frame rail 36. The cross-member may be hollow. The cross-member may be vehicle-forward of the vehicle battery tray 14. The vehicle frame 22 may include other cross-members extending cross-vehicle at various locations along the vehicle-longitudinal axis L.

The cross-member may be fixed directly to the first frame rail 34 and the second frame rail 36, e.g., by welding, fastening, etc. The cross-member may be unitary from the first frame rail 34 to the second frame rail 36, i.e., a single, uniform piece of material with no seams, joints, fasteners, or adhesives holding it together. A unitary component is formed as a single continuous unit, e.g., by molding, forging, casting, machining from a unitary blank, etc. Non-unitary components, in contrast, are formed separately and subsequently assembled, e.g., by threaded engagement, welding, etc.

Figure 2:
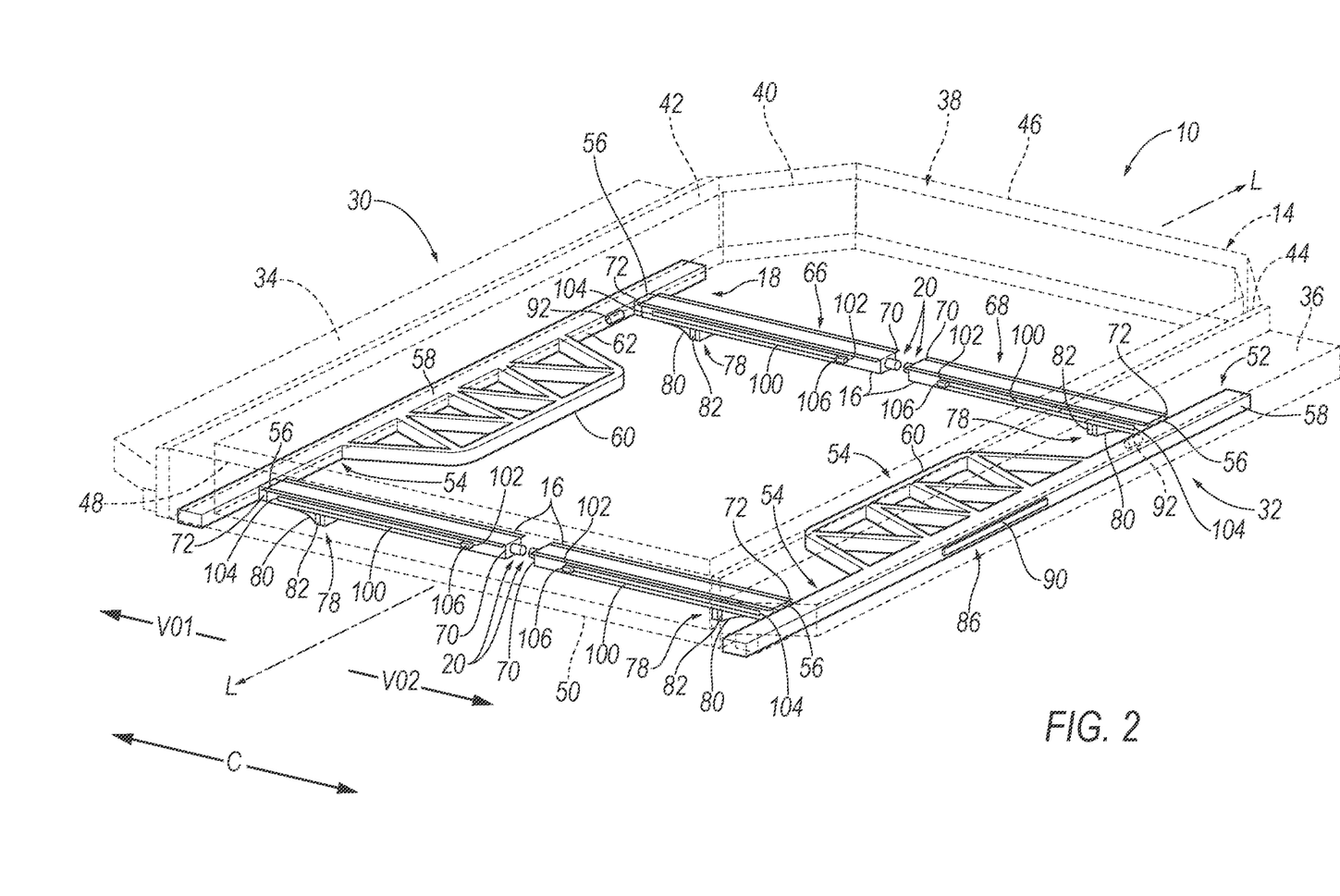
FIG. 2 is a perspective view of the vehicle battery tray wherein the braces are supported by a bottom panel of the vehicle battery tray.
Figure 3:
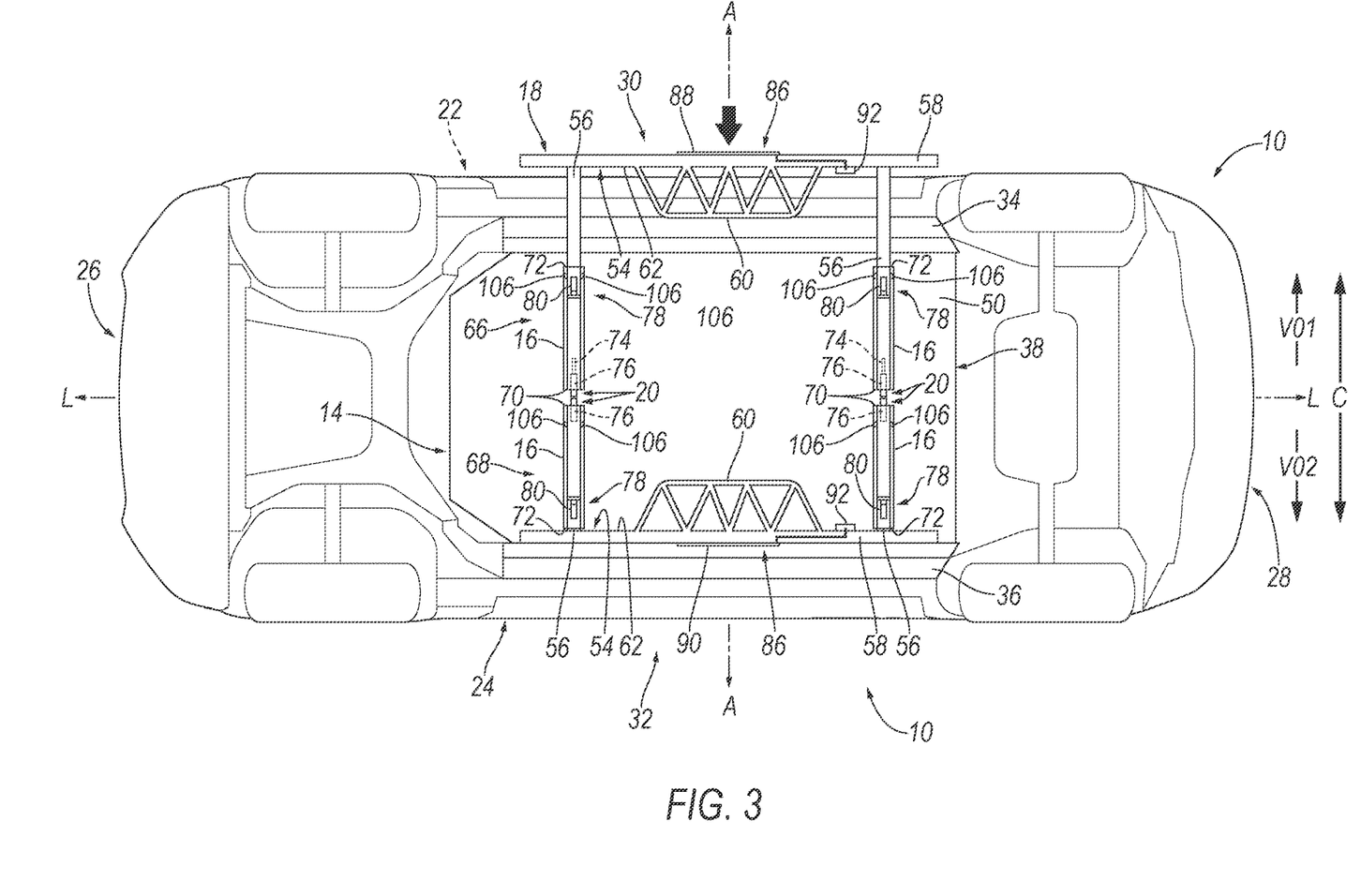
FIG. 3 is a plan view of the underside of the vehicle having one brace in the undeployed position and the other of the braces is in a deployed position.

With reference to FIG. 2, the vehicle battery tray 14 defines a battery compartment 38 that houses one or more vehicle batteries 40. In other words, the vehicle battery tray 14 supports the one or more vehicle batteries 40. The battery compartment 38 may be generally rectangular, or any suitable shape. The vehicle battery tray 14 may be metal or any suitable material. The vehicle battery tray 14 is supported by the vehicle frame 22, as described further below. Additionally or alternatively, one or more intermediary structures, e.g., cross-beams, brackets, etc., may fix the vehicle battery tray 14 to the vehicle frame 22. The vehicle battery tray 14 may be the lowermost component of the vehicle 12 at the location of the battery compartment 38. In other words, no other components are below the vehicle battery tray 14 and the vehicle battery tray 14 is exposed to the driving surface below the vehicle 12.

The vehicle battery tray 14 extends from the first frame rail 34 to the second frame rail 36. The vehicle battery tray 14 may be continuous from the first frame rail 34 to the second frame rail 36. Specifically, the vehicle battery tray 14 may span the entire underbody of the vehicle 12 from the first frame rail 34 to the second frame rail 36. The vehicle battery tray 14 supports one or more batteries, e.g., in the battery compartment 38. The vehicle battery tray 14 supports hardware associated with the batteries such as wiring, cooling hardware, mounting hardware, etc., e.g., in the battery compartment 38.

The vehicle battery tray 14 includes a first side member 42 and a second side member 44. The battery compartment 38 is defined between the first side member 42 and the second side member 44. The first side member 42 and the second side member 44 may define vehicle-outboard boundaries of the battery compartment 38, as shown in the example in the Figures. As another example, the vehicle battery tray 14 may include intermediate components between the first side member 42 and the battery compartment 38 and/or the second side member 44 and the battery compartment 38.

The vehicle battery tray 14 may include a front wall 46 and a rear wall 48 extending from the first side member 42 and the second side member 44. In the example shown in the Figures, the battery compartment 38 is disposed between the front wall 46 and the rear wall 48. Specifically, the battery compartment 38 is disposed between the first side member 42, the second side member 44, the front wall 46, and the rear wall 48. In examples including the front wall 46 and the rear wall 48, the front wall 46 and the rear wall 48 may be fixed to the first side member 42 and the second side member 44, e.g., by fasteners and/or welding. The first side member 42, the second side member 44, the front wall 46, and the rear wall 48 may be of any shape, e.g., linear or non-linear depending on the architecture of the vehicle 12. For example, as shown in the Figures, the first side member 42, the second side member 44, and the rear wall 48 are linear and the front wall 46 is non-linear.

With continued reference to FIG. 2, the vehicle battery tray 14 may include a bottom panel 50 and/or a top panel. The top panel is not shown in FIG. 2 to illustrate the battery compartment 38. The bottom panel 50 and the top panel may be fixed to the first side member 42, the second side member 44, the front wall 46, and/or the rear wall 48 to enclose the battery. In such an example, the battery compartment 38 is defined between the bottom panel 50 and the top panel. The bottom panel 50 may be exposed to the road surface and may prevent intrusion of precipitation and dirt to the battery modules. The bottom panel 50 may extend from the first side member 42 to the second side member 44 above the braces 18, 52 and the vehicle battery 40, i.e., in the battery compartment 38, is supported by the bottom panel 50. In other words, the battery and the battery compartment 38 are above the braces 18, 52.

The top panel may separate the battery compartment 38 from components of the vehicle 12 above the vehicle battery tray 14, e.g., the passenger compartment. The bottom panel 50 and the top panel may be fixed to the first side member 42, the second side member 44, the front wall 46, and/or the rear wall 48, e.g., by fasteners and/or welding. The first side member 42, the second side member 44, front wall 46, rear wall 48, bottom panel 50, and top panel may be sealed to each other such that the battery compartment 38 is environmentally sealed, i.e., to prevent intrusion of road precipitation and dirt. The top panel may be sandwiched between a vehicle floor (not shown) of the passenger compartment and the first side member 42 and second side member 44. As another example, the top panel may be the vehicle floor of the passenger compartment.

With continued reference to FIG. 2, as set forth above, the vehicle battery tray 14 is supported by the vehicle frame 22. Additionally or alternatively, one or more intermediary structures, e.g., cross-beams, brackets, etc., may fix the vehicle battery tray 14 to the vehicle frame 22.

The first side member 42 of the vehicle battery tray 14 is connected to the first frame rail 34 and the second side member 44 of the vehicle battery tray 14 is connected to the second frame rail 36. For example, the first side member 42 and the second side member 44 may include holes (not shown) that align with holes (not shown) in the first frame rail 34 and the second frame rail 36, respectively, through which fasteners (not shown) engage the first side member 42 to the first frame rail 34 and connect the second side member 44 to the second frame rail 36. The fasteners may be, for example, threaded. The first frame rail 34 and second frame rail 36 and/or the first side member 42 and second side member 44 may include weld nuts (not shown) to engage threads of the fastener. As another example, the fasteners may include a flexible battery mount (not shown). In such an example, fastener may include both a threaded fastener and the flexible battery mount. The flexible battery mount may be disposed between the threaded fastener and the frame rails 34, 36 to dampen vibration between the frame rail and the vehicle battery tray 14. Specifically, the flexible battery mount may be designed to isolate the vehicle battery tray 14 from road vibration. The flexible batter mount may be, for example, rubber, such as a silicone-based rubber.

The vehicle battery tray 14 may be fixed to the vehicle 12 as a unit. For example, the first side member 42 and the second side member 44 may be fixed to the vehicle frame 22, as described above, and the other components of the vehicle battery tray 14 may be supported by the first frame member and the second frame member. As an example, the engagement of the fasteners may support the first side member 42 and the second side member 44 on the vehicle frame 22 and the rest of the components of the vehicle battery tray 14 may be supported by the first side member 42 and the second side member 44.

The vehicle battery 40 may be of any suitable type for vehicular electrification, i.e., for powering propulsion of the vehicle 12. For example, the vehicle battery 40 may power a drivetrain motor (not shown) of the vehicle 12. For example, the vehicle battery 40 may be lithium-ion batteries, nickel-metal hydride batteries, lead-acid batteries, or ultra-capacitors, as used in, for example, plug-in hybrid electric vehicles (PHEVs), hybrid electric vehicles (HEVs), or battery electric vehicles (BEVs). The batteries may be arranged as battery modules (not shown). In examples including multiple battery modules, adjacent ones of the battery modules are connected to each other. Each battery module may include one or more battery cells (not shown). The battery compartment 38 receives the batteries, e.g., the battery modules. The vehicle battery 40 may include any suitable hardware, e.g., wiring, connectors, circuits, etc., connecting the vehicle battery modules to each other and to electrified components of the vehicle 12.

With reference to FIGS. 1-5, the vehicle 12 may include one or more braces 18, 52 supported by the vehicle battery tray 14. Specifically, the vehicle 12 includes one or more braces 18, 52 supported by the bottom panel 50 of the vehicle battery tray 14. For example, the vehicle 12 may include a pair of braces 18, 52, the first brace 18 and a second brace 52, one on each side of the vehicle 12. In other words, as shown in the Figures, the vehicle 12 includes the first brace 18 adjacent the first side 30 of the vehicle 12 and the second brace 52 spaced cross-vehicle and adjacent to the second side 32 of the vehicle 12. In other words, the first brace 18 is on the left side of the vehicle 12 in the example in the Figures and in other examples the first brace may be on the right side of the vehicle 12 and, in examples including the second brace 52, the second brace 52 is on the opposite side of the vehicle 12 from the first brace 18. In the example shown in the Figures, the first brace 18 and the second brace 52 are identical to each other and are supported on opposite sides of the vehicle 12. The first brace 18 of the vehicle 12 is adjacent the first frame rail 34 and the second brace 52 is adjacent the second frame rail 36. Specifically, the first brace 18 elongated along the first frame rail 34 and the second brace 52 elongated along the second frame rail 36.

The braces 18, 52 distribute loads from certain side vehicle impacts to manage deformation into the vehicle 12 along the frame rails 34, 36. This distribution of forces reduces the concentration of forces in the braces 18, 52 to manage deformation into the vehicle 12, e.g., the vehicle battery tray 14. This distribution of forces in combination with the energy absorption by the frame rails 34, 36 manages deformation to maintain the structural integrity of the vehicle battery tray 14.

Each of the braces 18, 52 includes a plurality of portions 54, 56. Specifically, the braces 18, 52 include a vehicle-longitudinal portion 54 and a pair of cross-vehicle portions 56. The vehicle-longitudinal portions 54 are elongated longitudinally relative to the vehicle 12, i.e., along the v. Each vehicle-longitudinal portion 54 of each brace 18, 52 is adjacent each of the first frame rail 34 and the second frame rail 36. In other words, the vehicle-longitudinal portion 54 of the first brace 18 is adjacent the first frame rail 34 and the vehicle-longitudinal portion 54 of the second brace 52 is adjacent the second frame rail 36. The vehicle-longitudinal portion 54 of the first brace 18 is spaced cross-vehicle from the vehicle-longitudinal portion 54 of the second brace 52. The vehicle-longitudinal portions 54 may each be elongated along each of the first frame rail 34 and the second frame rail 36. In some examples, the vehicle-longitudinal portions 54 may be parallel each of the first frame rail 34 and the second frame rail 36.

The vehicle-longitudinal portions 54 may each include a beam 58 and a truss 60. The beam 58 may be elongated linearly longitudinally along the vehicle 12, i.e., along the vehicle-longitudinal axis L. The beams 58 may be adjacent each side of the vehicle 12, i.e., the beams 58 may be adjacent the first side 30 and the second side 32 of the vehicle 12. Specifically, the beams 58 may each be adjacent one of the first frame rail 34 and the second frame rail 36. In other words, the beams 58 may each be elongated along each of the first frame rail 34 and the second frame rail 36.

The truss 60 is fixed to the beam 58. As shown in the Figures, the truss 60 may be fixed to a vehicle-inboard side 62 of the beam 58. In other words, the truss 60 is vehicle-inboard of the beam 58. The beam 58 of the first brace 18 is between the first frame rail 34 and the truss 60 of the first brace 18. The beam 58 of the second brace 52 is between the second frame rail 36 and the truss 60 of the second brace 52. The truss 60 and the beam 58 may be unitary with each other. In other words, the truss 60 and the beam 58 may be formed of a single continuous piece.

The truss 60 may include a plurality of members (not numbered) arranged in a pattern of alternating triangles along the beam 58. In the Figures, each truss 60 includes seven triangles along the beam 58. Specifically, the triangles may be arranged along the vehicle-longitudinal axis L. The truss 60 allows for load distribution along the beam 58 in the event of certain vehicle impacts, e.g., certain side vehicle impacts.

As discussed above, each brace 18, 52 includes a pair of cross-vehicle portions 56. In other words, the first brace 18 on the first side 30 of the vehicle 12 includes two cross-vehicle portions 56 and the second brace 52 on the second side 32 of the vehicle 12 includes two cross-vehicle portions 56. The two cross-vehicle portions 56 of the first brace 18 are spaced from the two cross-vehicle portions 56 of the second brace 52. The cross-vehicle portions 56 are fixed to the vehicle-longitudinal portions 54 of the braces 18, 52. Specifically, the cross-vehicle portions 56 are fixed to the beams 58 of the vehicle-longitudinal portions 54. The truss 60 is between the cross-vehicle portions 56 along the beam 58.

The cross-vehicle portions 56 are elongated along the cross-vehicle axis A. In other words, the cross-vehicle portions 56 are elongated transverse, e.g., perpendicular, to the beams 58 of the vehicle-longitudinal portions 54. The cross-vehicle portions 56 may each be elongated from a distal end 64 to the beams 58 of the vehicle-longitudinal portions 54. The distal ends 64 are spaced from the beams 58 along the cross-vehicle axis A. When both braces 18, 52 are in the undeployed positions, the distal ends 64 are closer in proximity to each other than when the braces 18, 52 are in the deployed position.

The cross-vehicle portions 56 of each brace 18, 52 are spaced from each other along the vehicle-longitudinal axis L. Specifically, the two cross-vehicle portions 56 of the first brace 18 are spaced from each other along the vehicle-longitudinal axis L and the two cross-vehicle portions 56 of the second brace 52 are spaced from each other along the vehicle-longitudinal axis L. The cross-vehicle portions 56 of each brace 18, 52 are spaced from each other along the vehicle-longitudinal portions 54. Specifically, the cross-vehicle portions 56 of each brace 18, 52 are spaced from each other along the beams 58 of the vehicle-longitudinal portions 54. In other words, the two cross-vehicle portions 56 of the first brace 18 are spaced from each other along the beam 58 of the vehicle-longitudinal portion 54 and the two cross-vehicle portions 56 of the second brace 52 are spaced from each other along the beam 58 of the vehicle-longitudinal portion 54. The two cross-vehicle portions 56 of the first brace 18 are spaced from the two cross-vehicle portions 56 of the second brace 52.

The braces 18, 52 are slidable relative to the vehicle battery tray 14 from the undeployed position to the deployed position. Specifically, the braces 18, 52 are slidable relative to the bottom panel 50 of the vehicle battery tray 14 from the undeployed position to the deployed position. In the event of certain vehicle impact, e.g., certain side vehicle impacts, the braces 18, 52 may slide to the deployed position. The braces 18, 52 are slidable relative to the first frame rail 34 and the second frame rail 36. The braces 18, 52 are slidably supported by the vehicle battery tray 14. Specifically, the braces 18, 52 are slidably supported by the bottom panel 50 of the vehicle battery tray 14. The braces 18, 52 are slidable in the cross-vehicle direction C. Specifically, the braces 18, 52 are slidable in opposite vehicle-outboard directions VO1, VO2 along the cross-vehicle direction C. In other words, one of the braces 18, 52 slides in the first vehicle-outboard direction VO1 and the other of the braces 18, 52 slides in the second vehicle-outboard direction VO2.

With reference to FIG. 1, during normal operation of the vehicle 12, e.g., driving or parking, the braces 18, 52 remain in the undeployed position. In the undeployed position, the braces 18, 52 are under the vehicle battery tray 14. In other words, the braces 18, 52 are between the road surface and the bottom panel 50 of the vehicle battery tray 14. In the undeployed position, at least a portion of the braces 18, 52 is vehicle-inboard of one or more of the first frame rail 34 and the second frame rail 36. In the example shown in FIG. 1, both braces 18, 52 are vehicle-inboard of the first frame rail 34 and the second frame rail 36 in the undeployed position. Specifically, the vehicle-longitudinal portions 54 and the cross-vehicle portions 56 are vehicle-inboard of the first frame rail 34 and the second frame rail 36 as shown in FIG. 1.

Figure 4A:
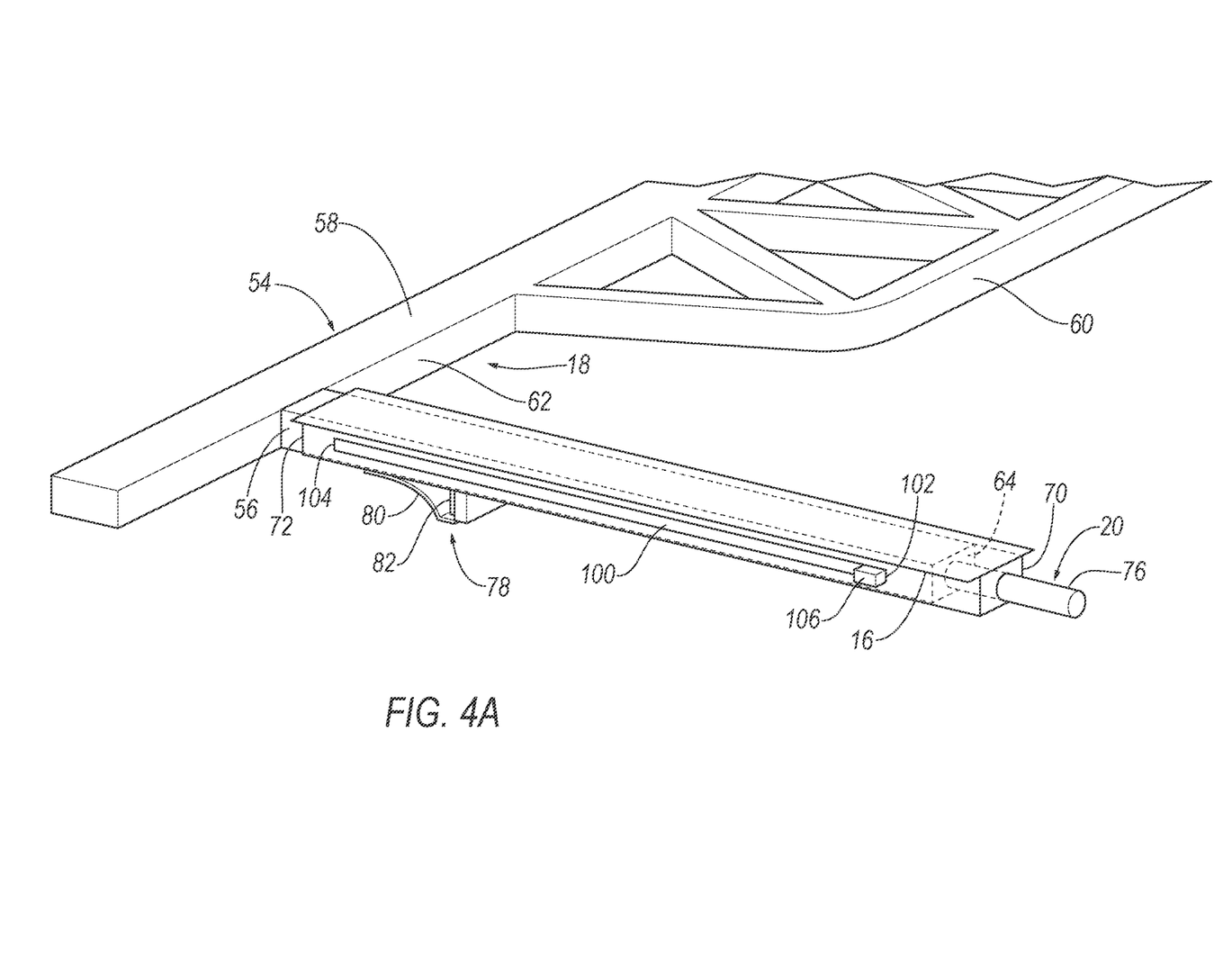
FIG. 4A is a perspective view of a portion of one of the braces in the undeployed position.
Figure 4B:
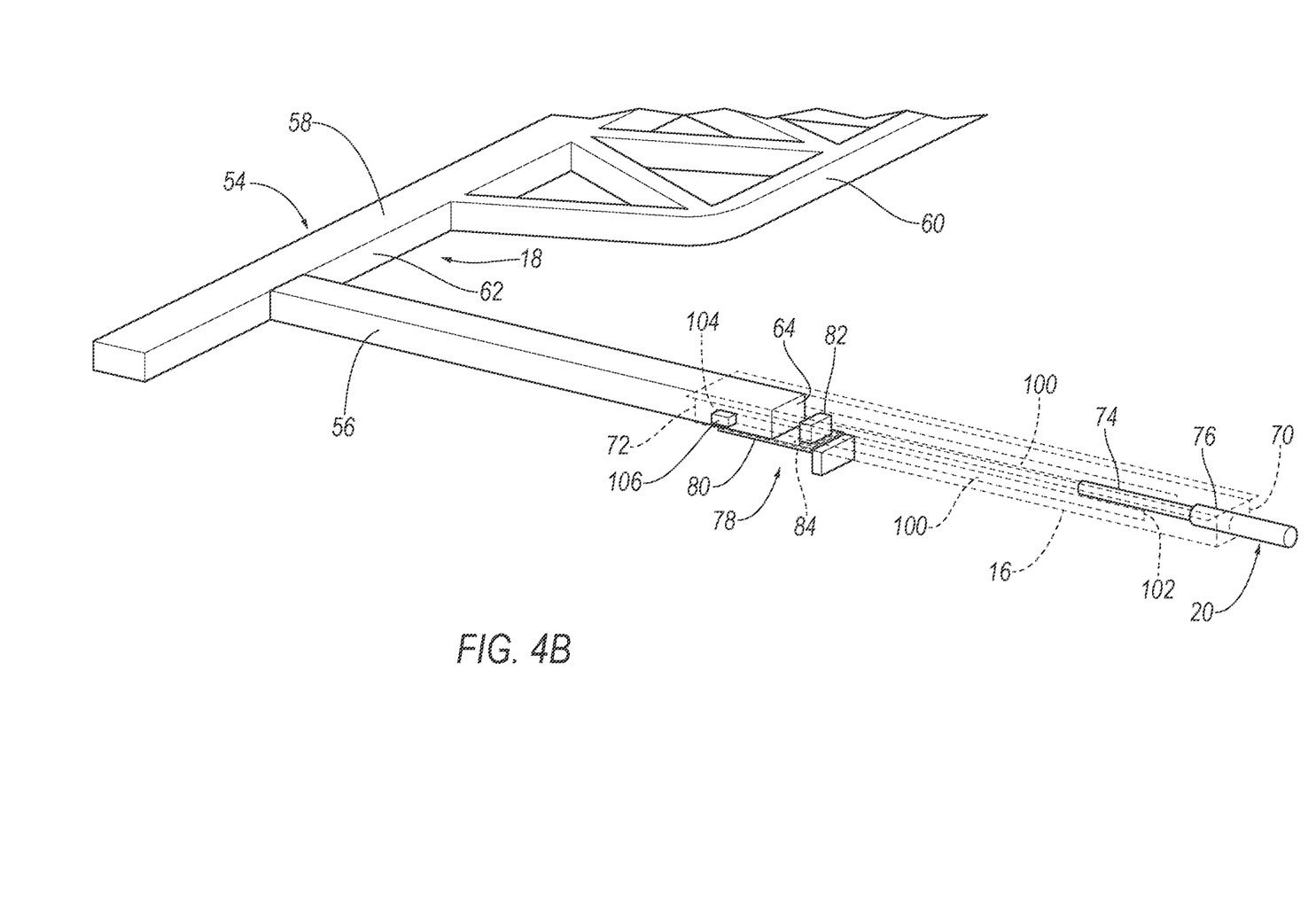
FIG. 4B is a perspective view of a portion of one of the braces in the deployed position.

With reference to FIGS. 2, and 4B, in the event of certain vehicle impacts, specifically, certain side vehicle impacts, each of the braces 18, 52 may be selectively deployable depending on the side of the vehicle 12 to which the side vehicle impact occurs. Specifically, each brace 18, 52 on each side of the vehicle 12 may deploy only when certain side vehicle impacts occur to the side of the vehicle 12 adjacent the brace. In other words, if certain side vehicle impacts occur to the first side 30 of the vehicle 12, the first brace 18 may move to the deployed position and if certain side vehicle impacts occur to the second side 32 of the vehicle 12, the second brace 52 may move to the deployed position. In such examples, only one brace 18, 52 slides to the deployed position. As the brace 18, 52 moves to the deployed position, the brace 18, 52 slides in the cross-vehicle direction C toward certain side vehicle impacts to the side of the vehicle 12 adjacent the brace 18, 52. In other words, the braces 18, 52 slides in the cross-vehicle direction C toward the frame rail 34, 36 adjacent the brace 18, 52 and adjacent certain side vehicle impacts. In other words, the first brace 18 slides toward the first frame rail 34 and the second brace 52 slides toward the second frame rail 36. The brace 18, 52 continues to slide past the frame rails 34, 36 until at least a portion of the brace 18, 52 is vehicle-outboard of one of the first frame rail 34 and the second frame rail 36. In other words, in the deployed positions, at least a portion of the brace 18, 52 is vehicle-outboard of one of the first frame rail 34 and the second frame rail 36. As shown in the Figures, the vehicle-longitudinal portion 54 is vehicle-outboard of the frame rails 34, 36 in the deployed position. In other words, in the deployed position, the vehicle-longitudinal portions 54 of the braces 18, 52 are vehicle-outboard of one of the frame rails 34, 36.

The braces 18, 52 may be slidable relative to the vehicle battery tray 14 and the frame rails 34, 36 along one or more tracks 16. In other words, the braces 18, 52 are slidably supported by the tracks 16. The vehicle 12 includes two or more tracks 16 fixed relative to the vehicle battery tray 14. The tracks 16 may be fixed directly to the vehicle battery tray 14. As an example shown in the Figures, the tracks 16 are fixed to the bottom panel 50 of the vehicle battery tray 14. In the example shown in the Figures, the vehicle 12 includes two sets of tracks 66, 68 with each set of tracks 66, 68 including two tracks 16. Specifically, a first set of tracks 66 includes two tracks 16 and a second set of tracks 68 includes two tracks 16. The two 66, 68 are each spaced cross-vehicle from each other with one set of tracks 16 corresponding to each of the braces 18, 52.

The braces 18, 52 are slidably engaged with the tracks 16. Specifically, the first brace 18 is slidably engaged with at least one track 16 and the second brace 52 is slidably engaged with at least one track 16. In the example shown in the Figures, each brace 18, 52 is slidable along one of the sets of tracks 66, 68. In other words, the first set of tracks 66 is engaged with the first brace 18 and the second set of tracks 68 is engaged with the second brace 52. In the example shown in the Figures, since each set of tracks 16 includes two tracks 16, each of the braces 18, 52 is slidably engaged with two tracks 16. In such an example, the first brace 18 is slidably engaged with the two tracks 16 of the first set of tracks 66 and the second brace 52 is slidably engaged with the two tracks 16 of the second set of tracks 68. As the braces 18, 52 move to the deployed position, the braces 18, 52 slide along the tracks 16 from the undeployed position to the deployed position. Specifically, the braces 18, 52 slide along the tracks 16 in the cross-vehicle direction C and in the vehicle-outboard directions VO1, VO2. In other words, the first brace 18 slides along the first set tracks 16 in the first vehicle-outboard direction VO1 and the second brace 52 slides along the second set of tracks 68 in the second vehicle-outboard direction VO2.

The two tracks 16 of the first set of tracks 66 are spaced longitudinally from each other along the bottom panel 50 of the vehicle battery tray 14 and the two tracks 16 of the second set of tracks 68 are spaced longitudinally from each other along the bottom panel 50 of the vehicle battery tray 14. Specifically, the two tracks 16 of the first set of tracks 66 are spaced from each other along the vehicle-longitudinal axis L and the two tracks 16 are spaced from each other along the vehicle-longitudinal axis L. In other words, each of the tracks 16 of each set of tracks 16 is spaced from each other along the vehicle-longitudinal axis L.

Each of the tracks 16 is aligned with one of the cross-vehicle portions 56 of the braces 18, 52. Specifically, the two tracks 16 of the first set of tracks 66 are aligned with the cross-vehicle portions 56 of the first brace 18 and the two tracks 16 of the second set of tracks 68 are aligned with the cross-vehicle portions 56 of the second brace 52. The cross-vehicle portions 56 of the braces 18, 52 are each slidably engaged with each of the tracks 16. In other words, each of the cross-vehicle portions 56 of the first brace 18 and the second brace 52 are engaged with each of the tracks 16. Specifically, the cross-vehicle portions 56 of the first brace 18 are slidably engaged with each of the tracks 16 of the first set of tracks 66 and the cross-vehicle portions 56 of the second brace 52 are slidably engaged with each of the tracks 16 of the second set of tracks 68. As the braces 18, 52 slide from the deployed positions, the cross-vehicle portions 56 of each of the braces 18, 52 slides along the tracks 16 until the braces 18, 52 reach the deployed positions.

Because the cross-vehicle portions 56 are slidably engaged with the tracks 16 and the braces 18, 52 are slidable in the cross-vehicle direction C, each of the tracks 16 are elongated in the cross-vehicle direction C. Specifically, the tracks 16 may be elongated along the cross-vehicle axis A. The tracks 16 may be elongated from a first end 70 to a second end 72. In the examples shown in the Figures, the first ends 70 of the tracks 16 are vehicle-inboard of the second ends 72. The second ends 72 are adjacent the frame rails 34, 36. Specifically, the second ends 72 of the first set of tracks 66 are adjacent the first frame rail 34 and the second ends 72 of the second set of tracks 68 are adjacent the second frame rail 36. The first ends 70 are spaced vehicle-inboard from the frame rails 34, 36.

The tracks 16 include a pair of slots 100 elongated along sides (not numbered) of the tracks 16. The slots 100 may be elongated between the first ends 70 and the second ends 72 of the tracks 16. Specifically, the slot 100 extends from a first point 102 spaced from the first end and a second point 104 spaced from the second end. In other words, the slots 100 extend at least partially along the entire tracks 16, but not from the first ends 70 to the second ends 72 of the tracks 16. The first end 70 is vehicle-inboard of the first point 102 and the second end 72 is vehicle-outboard from the second point 104.

The slots 100 act to guide 106 the cross-vehicle portions 56 as the cross-vehicle portions 56 move along the tracks 16. For example, the cross-vehicle portions 56 may include one or more guides 106 receivable by one or more of the slots 100. The guides 106 move along the slots 100 as the cross-vehicle portions 56 move along the tracks. In the undeployed position, the guide 106 is at the first point 102. In the deployed position, the guide 106 is at the second point 104. In other words, as the brace 18, 52, moves toward the deployed position, the guide 106 moves from the first point 102 to the second point 104. Because the second point 104 is spaced vehicle-outboard of the second end 72, the guide 106 cannot move past the second point 104, thereby stopping the cross-vehicle portions 56 from moving beyond the track 16 as the brace 18, 52 move to the deployed position.

When the braces 18, 52 are in the undeployed positions, the distal ends 64 of the cross-vehicle portions 56 of the braces 18, 52 are adjacent the first ends 70 of the tracks 16. As the braces 18, 52 move to the deployed position, the distal ends 64 move toward the second ends 72. The cross-vehicle portion 56 may overlap the second ends 72 in the deployed position to allow the braces 18, 52 to extend vehicle-outboard of the frame rails 34, 36 and remain attached to the vehicle 12.

With reference to FIGS. 4A and 4B, the assembly 10 includes a plurality of pyrotechnic actuators 20 operatively coupled to the braces 18, 52 to slide the braces 18, 52 along the tracks 16 from the undeployed positions to the deployed positions. Specifically, the braces 18, 52 are slidable relative to the vehicle battery tray 14 by the pyrotechnic actuators 20. In other words, activation of the pyrotechnic actuators 20 applies a force to the braces 18, 52 to move the braces 18, 52 from the undeployed positions to the deployed positions. In the event of certain vehicle impacts, the pyrotechnic actuators 20 are activated to move the braces 18, 52 to the deployed position. The position of braces 18, 52 may be maintained in the undeployed position relative to the tracks 16 absent application of a force above a predetermined magnitude to the brace 18, 52 in the vehicle-outboard direction VO1, VO2. The pyrotechnic actuator 20, when activated, applies a force above the predetermined magnitude to move the brace 18, 52 relative to the track 16 toward the deployed position. The brace 18, 52 may be maintained in the undeployed position absent application of a force above the predetermined magnitude by, for example, a tack weld, a fastener, a bracket, etc., between the brace 18, 52 and the track 16 designed to release upon application of force above the predetermined magnitude.

The pyrotechnic actuators 20 are fixed relative to the vehicle battery tray 14 and the tracks 16. A pyrotechnic actuator 20 may be fixed adjacent each of the tracks 16. Specifically, the pyrotechnic actuators 20 are fixed at the first ends 70 of each of the tracks 16. The pyrotechnic actuators 20 may be fixed in any suitable way. For example, the pyrotechnic actuators 20 may be fixed to the bottom panel 50 of the vehicle battery tray 14 or may be fixed to the tracks 16. The pyrotechnic actuators 20 may be fixed by, e.g., fasteners. The assembly 10 may include an equal number of pyrotechnic actuators 20 to the number of tracks 16. In the example shown in the Figures, the assembly 10 includes four pyrotechnic actuators 20 corresponding to the four tracks 16.

The pyrotechnic actuators 20 may be any suitable type of pyrotechnic actuators 20. In the example shown in the Figures, the pyrotechnic actuators 20 each include a post 74 movable relative to a housing 76. The post 74 moves relative to the tracks 16. In the undeployed position, the posts 74 abut the cross-vehicle portions 56. In the event of certain vehicle impacts, the pyrotechnic actuator 20 is activated and the posts 74 apply a force to the cross-vehicle portions 56 in the vehicle-outboard directions VO1, VO2. In other words, the force applied to the first brace 18 is in the first vehicle-outboard direction VO1 and the force applied to the second brace 52 is in the second vehicle-outboard direction VO2. As the force is applied to the cross-vehicle portions 56, the braces 18, 52 begin to move to the deployed position. The post 74 may have a limited range of movement along the track 16 based on a size of the housing 76. After the post 74 reaches its range of motion, the momentum generated by the activation of the pyrotechnic actuators 20 continues to move the braces 18, 52 to the deployed position. The assembly 10 may include bearings (not shown) that allow the cross-vehicle portions 56 to move along the track 16 after the pyrotechnic actuators 20 are activated. In other examples, the pyrotechnic actuators 20 may include springs or other components to move the braces 18, 52 toward the deployed positions.

In examples such as shown in the Figures, the pyrotechnic actuators 20 include a pyrotechnic charge that activates the pyrotechnic actuator 20 to move the braces 18, 52 to the deployed position. Specifically, the pyrotechnic charge moves the post 74 relative to the housing 76. The pyrotechnic charge may be combustible to produce a gas. The pyrotechnic charge may be formed of a solid mixture of substances that, when ignited, react to produce the gas. For example, the pyrotechnic charge may be formed of sodium azide (NaNO3), potassium nitrate (KNO3), and silicon dioxide (SiO2), which react to form nitrogen gas (N2).

With continued reference to FIGS. 4A and 4B, the assembly 10 includes a lock 78 fixed to each track 16. The locks 78 are movable from a disengaged position to an engaged position as the braces 18, 52 slide to the deployed positions. Specifically, the braces 18, 52 are lockable relative to the tracks 16 by the locks 78 when the braces 18, 52 are in the deployed positions. The braces 18, 52 are lockable relative to the vehicle battery tray 14. Because each brace 18, 52 is movable along two tracks 16, each brace 18, 52 is lockable by two locks 78 fixed to each track 16 along which the braces 18, 52 slide. In other words, the braces 18, 52 are each lockable by two locks 78.

The locks 78 maintain the braces 18, 52 in the deployed positions during certain vehicle impacts. The locks 78 are fixed nearer to the second ends 72 of the tracks 16 than to the first ends 70 along each track 16. In other words, the locks 78 are fixed at a position spaced vehicle-outboard from the pyrotechnic actuators 20 along each track 16. As the distal ends 64 of the cross-vehicle portions 56 slide along the tracks 16 toward the second ends 72, the lock 78 remains disengaged until the braces 18, 52 reach the deployed positions. In other words, the locks 78 engage when the braces 18, 52 reach the deployed positions.

As an example, and as shown in the Figures, the locks 78 may be spring loaded. In other words, the locks 78 include a spring 80 that resiliently biases the locks 78 toward the engaged position. In the example shown in the Figures, the locks 78 include a spring 80 and a block 82. The block 82 is receivable by a hole 84 in the track 16. The block 82 rests in the hole 84 and abuts the cross-vehicle portion 56 of the brace 18, 52 when the brace 18, 52 is in the undeployed position. As the cross-vehicle portions 56 reach the deployed positions, the cross-vehicle portion 56 of the brace 18, 52 moves vehicle-outboard of the block 82 and the spring 80 biases the block 82 through the hole 84 into the track 16 to the engaged position. After the distal ends 64 of the cross-vehicle portion 56 passes over the lock 78, the spring 80 moves the block 82 into the holes 84 and into the tracks 16. In some examples, the block 82 may abut the distal end 64 of the cross-vehicle portion 56 to prevent the cross-vehicle portions 56 from sliding vehicle-inboard along the track 16.

In other words, the blocks 82 maintain the braces 18, 52 in the deployed position and prevent the distal ends 64 from movement vehicle-inboard toward the first ends 70 of the tracks 16. In other examples, the distal ends 64 may be spaced vehicle-outboard from the blocks 82 to allow for very little movement of the cross-vehicle portions 56 along the tracks 16. The spring 80 of the lock 78 may be of any suitable type. In the example shown in the Figures, the spring 80 is a flat spring. In other words, the spring 80 may be a strip of suitable material, e.g., steel, that resiliently biases the block 82 toward the engaged position.

Figure 5:
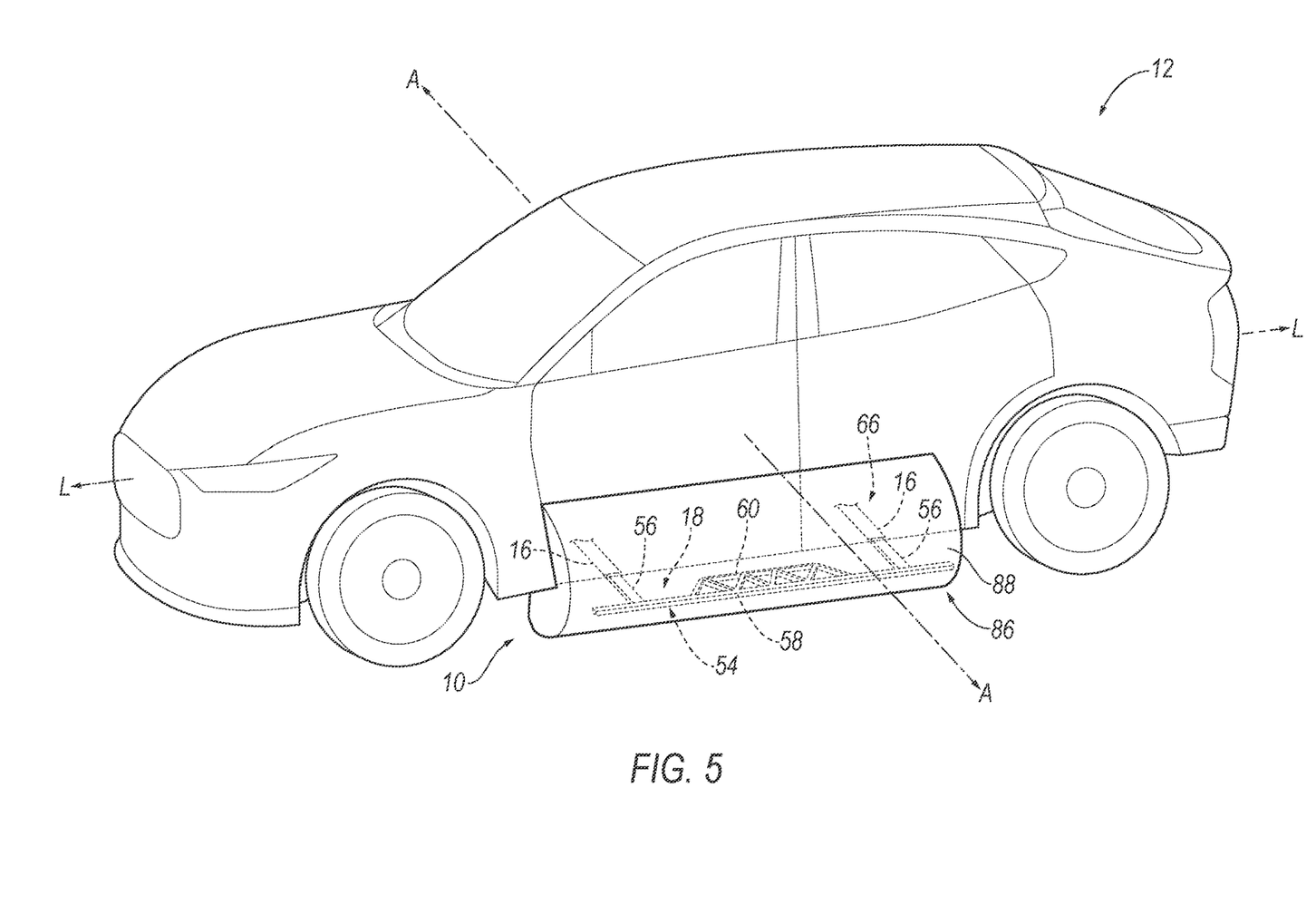
FIG. 5 is a side view of the vehicle wherein one of the braces is in the deployed position and an airbag supported by the brace is in an inflated position.

With reference to FIGS. 1, 2, and 5, the vehicle 12 may include an airbag assembly 86 supported by one or more of the braces 18, 52. Specifically, the airbag assemblies 86 are fixed to one or more of the braces 18, 52. The airbag assembly 86 includes an airbag, an inflator 92, and may include an airbag housing (not shown). The vehicle 12 may include any suitable number of airbag assemblies 86. As one example, each of the braces 18, 52 of the vehicle 12 may include one airbag assembly 86. In examples including more than one airbag assembly 86, the airbag assemblies 86 may be identical or substantially identical to each other. In the example shown in the Figures, an airbag assembly 86 may be fixed by each of the first brace 18 and the second brace 52. In other words, the vehicle 12 may include a first airbag 88 supported by the first brace 18 and a second airbag 90 supported by the second brace 52.

Each of the airbags 88, 90 is inflatable from an uninflated position to an inflated position. As discussed above, the airbags 88, 90 are supported by the brace. Specifically, the airbags 88, 90 may be supported by the vehicle-longitudinal portions 54 of the braces 18, 52. The airbags 88, 90 may be fixed to the vehicle-longitudinal portion 54 of the braces 18, 52. When the braces 18, 52 are in the undeployed position, the airbags 88, 90 are in the uninflated position. When the braces 18, 52 slide to the deployed position, the airbags 88, 90 inflate to the inflated position. The airbag may control the kinematics of a vehicle involved in certain vehicle impacts, specifically, certain side vehicle impacts, with the vehicle 12.

As discussed above, only one of the braces 18, 52 move to the deployed position at one time. Accordingly, only one of the airbags 88, 90 is in the inflated position at one time. In other words, if certain vehicle impacts are identified to the first side 30 of the vehicle 12, the first brace 18 slides to the deployed position and the first airbag 88 inflates to the inflated position and the second brace 52 remains in the undeployed position and the second airbag 90 remains in the uninflated position. Additionally, if certain vehicle impacts are identified to the second side 32 of the vehicle 12, the second brace 52 slides to the deployed position and the second airbag 90 inflates to the inflated position and the first brace 18 remains in the undeployed position and the first airbag 88 remains in the uninflated position.

An inflator 92 is fluidly connected to the each of the first airbag 88 and the second airbag 90. The inflators 92 expands the airbags 88, 90 with inflation medium, such as a gas, to inflate the airbag from the uninflated position to the inflated position. The inflators 92 may be, for example, a pyrotechnic inflator that ignites a chemical reaction to generate the inflation medium, a stored gas inflator that releases (e.g., by a pyrotechnic valve) stored gas as the inflation medium, or a hybrid. The inflators 92 may be fixed to any suitable way to any suitable portion of the braces 18, 52. For example, the inflators 92 may be fixed to the vehicle-longitudinal portions 54 of the braces 18, 52. In other examples, the inflators 92 may be fixed to the cross-vehicle portions 56 of the braces 18, 52.

The airbag 88 may be fabric, e.g., a woven polymer. For example, the fabric may be woven nylon yarn, for example, nylon 6, 6. Other examples of woven polymer include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 6:
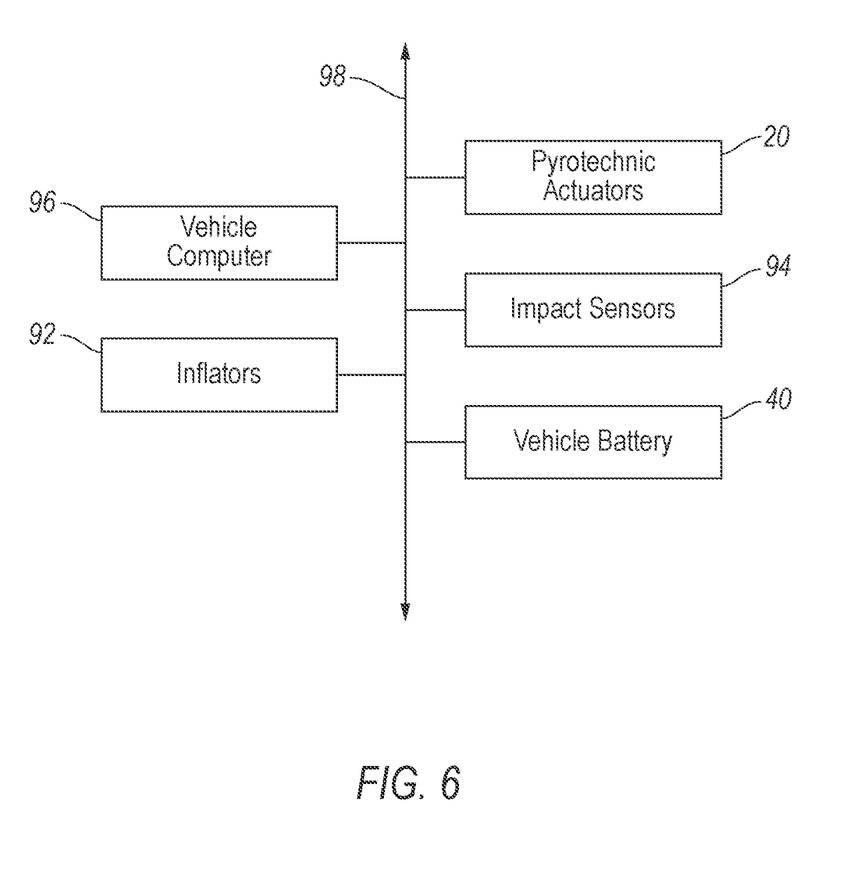
FIG. 6 is a block diagram of a vehicle communication network of the vehicle.

With reference to FIG. 6, the vehicle 12 may include at least one impact sensor 94 for sensing certain vehicle impacts (e.g., impacts of a certain magnitude, direction, etc.), and a vehicle computer 96 in communication with the impact sensor 94 and the inflator 92. The vehicle computer 96 may activate the inflator 92, e.g., provide an impulse to a pyrotechnic charge of the inflator 92 when the impact sensor 94 senses certain vehicle impacts. The impact sensor 94 may be configured to sense certain vehicle impacts prior to impact, i.e., pre-impact sensing. The impact sensor 94 may be in communication with the vehicle computer 96. The impact sensor 94 is configured to detect certain vehicle impacts. In other words, a "certain vehicle impact" is an impact of the type and/or magnitude for which deployment of the brace 18, 52 and/or airbag 88 is designed i.e., "certain" indicates the type and/or magnitude of the impact. The type and/or magnitude of such "certain vehicle impacts" may be prestored in the vehicle computer, e.g., a restraints control module and/or a body control module. The impact sensor 94 may be of any suitable type, for example, post contact sensors such as accelerometers, pressure sensors, and contact switches; and pre-impact sensors such as radar, LIDAR, and vision sensing systems. The vision sensing systems may include one or more cameras, CCD image sensors, CMOS image sensors, etc. The impact sensor 94 may be located at numerous points in or on the vehicle 12.

The vehicle computer 96 includes a processor and a memory storing instructions executable by the processor. The memory includes one or more forms of computer readable media, and stores instructions executable by the vehicle computer 96 for performing various operations, including as disclosed herein. The vehicle computer 96 may be a restraints control module or a body control module. The vehicle computer 96 can be a generic computer with the processor and the memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, the vehicle computer 96 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 96.

The vehicle computer 96 is generally arranged for communications on a vehicle communication network 98 that can include a bus in the vehicle 12 such as a controller area network CAN or the like, and/or other wired and/or wireless mechanisms. Alternatively or additionally, in cases where the vehicle computer 96 actually comprises a plurality of devices, the vehicle communication network 98 may be used for communications between devices represented as the vehicle computer 96 in this disclosure. Further, as mentioned below, various controllers and/or sensors may provide data to the vehicle computer 96 via the vehicle communication network 98.

Figure 7:
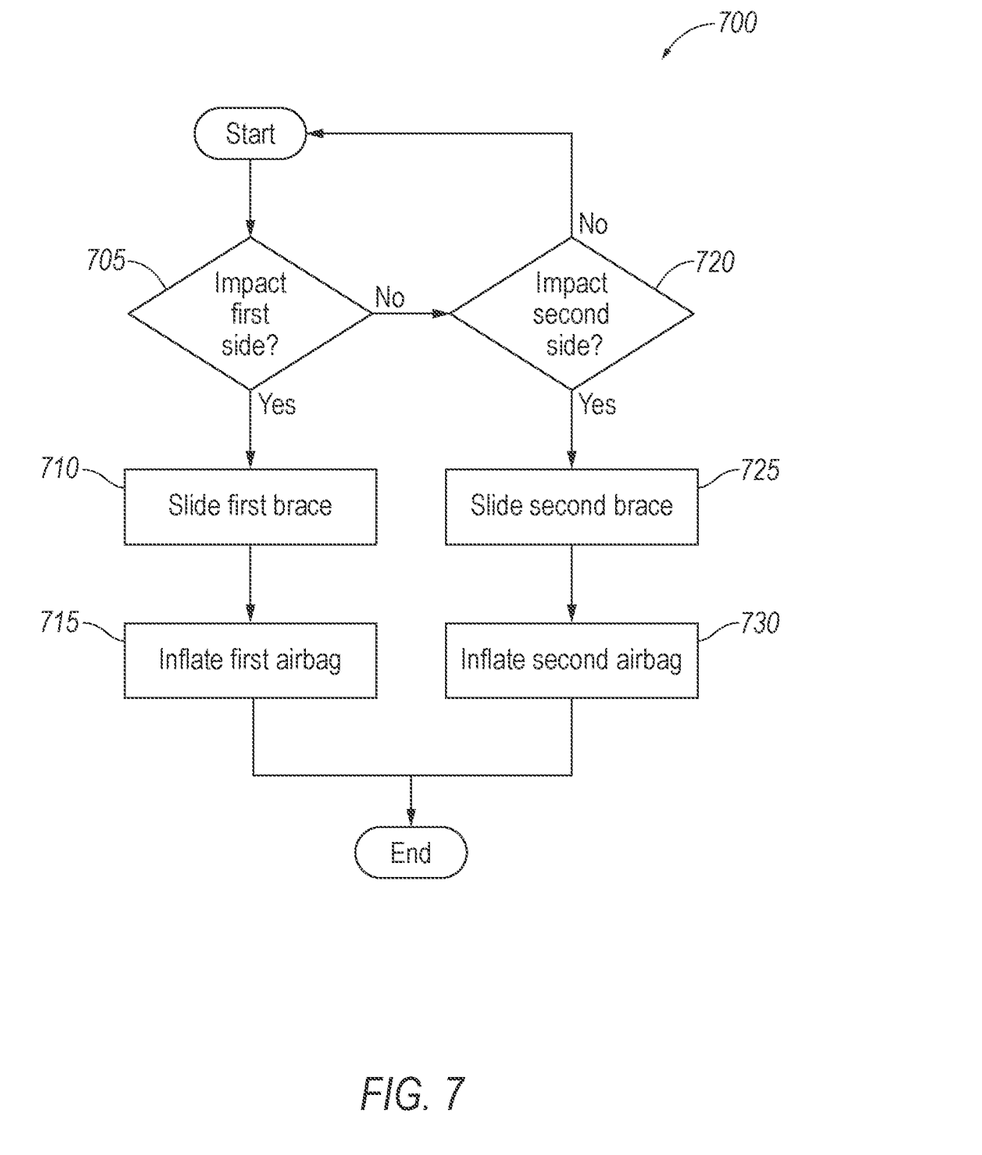
FIG. 7 is a flowchart of a method executable by a vehicle computer.

With reference to FIG. 7, the vehicle computer 96 stores instructions to control components of the vehicle 12 according to a method 700. Specifically, as shown in FIG. 7, the method 700 includes sliding the braces 18, 52 to the deployed position based on detecting a certain vehicle impact, e.g., a certain side vehicle impact. Use of "in response to," "based on," and "upon determining" herein, including with reference to method 700, indicates a causal relationship, not merely a temporal relationship.

With reference to decision block 705, the method 700 includes detecting a certain vehicle impact to the first side 30 of the vehicle 12. The impact sensors 94 of the vehicle 12 may provide a signal to the vehicle computer 96 identifying detection of a certain vehicle impact to the first side 30 of the vehicle 12. If a certain vehicle impact are not detected to the first side 30, the method 700 moves to decision block 720. If a certain vehicle impact is detected to the first side 30, the method 700 moves to block 710.

With reference to block 710, based on identifying a certain vehicle impact to the first vehicle side, the method 700 includes sliding the first brace 18 to the deployed position. The computer may send a signal to the pyrotechnic actuators 20 adjacent the first set of tracks 66 to activate and slide the cross-vehicle portions 56 along the tracks 16 of the first set of tracks 66. The cross-vehicle portions 56 of the first brace 18 slide along the tracks 16 until the first brace 18 reaches the deployed position.

With reference to block 715, based on sliding the first brace 18 to the deployed position, the method 700 includes inflating the first airbag 88 supported by the first brace 18 to the inflated position. The vehicle computer 96 may send a signal to the inflator 92 in fluid communication with the first airbag 88 to inflate the first airbag 88 with inflation medium until the first airbag 88 reaches the inflated position. After the airbag reaches the inflated position, the method 700 ends.

With reference to decision block 720, the method 700 includes detecting a certain vehicle impact to the second side 32 of the vehicle 12. The impact sensors 94 of the vehicle 12 may provide a signal to the vehicle computer 96 identifying detection of a certain vehicle impact to the second side 32 of the vehicle 12. If a certain vehicle impact to the second side 32 is not detected, the method 700 returns to its start. If certain vehicle impacts are identified to the second side 32, the method 700 moves to block 725.

With reference to block 725, based on detecting a certain vehicle impact to the second vehicle side, the method 700 includes sliding the second brace 52 to the deployed position. The computer may send a signal to the pyrotechnic actuators 20 adjacent the second set of tracks 68 to activate and slide the cross-vehicle portions 56 along the tracks 16 of the second set of tracks 68. The cross-vehicle portions 56 of the second brace 52 slide along the tracks 16 until the second brace 52 reaches the deployed position.

With reference to block 730, based on sliding the second brace 52 to the deployed position, the method 700 includes inflating the second airbag 90 supported by the second brace 52 to the inflated position. The vehicle computer 96 may send a signal to the inflator 92 in fluid communication with the second airbag 90 to inflate the second airbag 90 with inflation medium until the second airbag 90 reaches the inflated position. After the airbag reaches the inflated position, the method 700 ends.

The disclosure has been described in an illustrative manner, and it is to be understood that the terminology which has been used is intended to be in the nature of words of description rather than of limitation. The numerical adverbs "first" and "second" are used herein merely as identifiers and do not signify order or importance. Many modifications and variations of the present disclosure are possible in light of the above teachings, and the disclosure may be practiced otherwise than as specifically described.

What is claimed is:

1. An assembly comprising:
   a vehicle battery tray;
   a track fixed relative to the vehicle battery tray, the track being elongated along a cross-vehicle axis;
   a brace slideably engaged with the track, the brace being slidable along the track relative to the vehicle battery tray along the cross-vehicle axis in a vehicle-outboard direction from an undeployed position to a deployed position; and
   a pyrotechnic actuator operatively coupled to the brace to slide the brace along the track from the undeployed position to the deployed position.

2. The assembly of claim 1, further comprising a second track fixed relative to the vehicle battery tray and spaced along a vehicle-longitudinal axis from the track, the second track being elongated along the cross-vehicle axis and the brace being slidably engaged with the second track.

3. The assembly of claim 2, wherein the brace includes a vehicle-longitudinal portion elongated along the vehicle-longitudinal axis and a pair of cross-vehicle portions fixed to the vehicle-longitudinal portion, one of the cross-vehicle portions is slidably engaged with the track and the other of the cross-vehicle portions is slidably engaged with the second track.

4. The assembly of claim 2, further comprising a lock fixed to each of the track and the second track, the brace being lockable relative to the track and the second track by the locks when the brace is in the deployed position.

5. The assembly of claim 4, wherein each of the locks are spring loaded.

6. The assembly of claim 2, further comprising a second pyrotechnic actuator operatively coupled to the brace, the brace being slidable along the track and the second track by the pyrotechnic actuator and the second pyrotechnic actuator.

7. The assembly of claim 1, further comprising a second pyrotechnic actuator operatively coupled to the brace, the brace being slidable relative to the vehicle battery tray by the pyrotechnic actuator and the second pyrotechnic actuator.

8. The assembly of claim 1, further comprising an airbag supported by the brace, the airbag being inflatable from an uninflated position to an inflated position, the airbag being in the uninflated position when the brace is in the undeployed position, and the airbag being in the inflated position when the brace is in the deployed position.

9. The assembly of claim 1, wherein the brace includes a vehicle-longitudinal portion elongated along a vehicle-longitudinal axis and a pair of cross-vehicle portions fixed to the vehicle-longitudinal portion, the cross-vehicle portions being spaced from each other along the vehicle-longitudinal portion.

10. The assembly of claim 9, wherein the vehicle-longitudinal portion includes a beam elongated along the vehicle-longitudinal axis and a truss fixed to the beam, the truss being between the cross-vehicle portions along the beam.

11. The assembly of claim 1, further comprising:
    a second track fixed relative to the vehicle battery tray, the second track being spaced from the track and elongated along the cross-vehicle axis;
    a second brace slideably engaged with the second track, the second brace being slidable along the second track relative to the vehicle battery tray along the cross-vehicle axis from an undeployed position to a deployed position;
    the second brace being slidable in a vehicle-outboard direction opposite from the brace; and
    a second pyrotechnic actuator operatively coupled to the second brace to slide the second brace along the second track from the undeployed position to the deployed position.

12. The assembly of claim 11, further comprising a computer including a processor and a memory storing instructions executable by the processor to:
    detect certain vehicle impacts to a first vehicle side;
    based on detection of a certain vehicle impact to the first vehicle side, slide the brace to the deployed position; and
    based on sliding the brace to the deployed position, inflate an airbag supported by the brace to an inflated position.

13. The assembly of claim 12, wherein the instructions include instructions to:
    detect certain vehicle impacts to a second vehicle side;
    based on detection of a certain vehicle impact to the second vehicle side, slide the second brace to the deployed position; and
    based on sliding the second brace to the deployed position, inflate an airbag supported by the second brace to an inflated position.

14. The assembly of claim 1, further comprising a computer including a processor and a memory storing instructions executable by the processor to:
    detect certain vehicle impacts;
    based on detection of the certain vehicle impact, slide the brace to the deployed position; and
    based on sliding the brace to the deployed position, inflate an airbag supported by the brace to an inflated position.

15. A vehicle comprising:
    a vehicle frame having a first frame rail and a second frame rail spaced cross-vehicle from the first frame rail, each of the first frame rail and the second frame rail being elongated along a vehicle-longitudinal axis;
    a vehicle battery tray between the first frame rail and the second frame rail along a cross-vehicle axis;
    a vehicle battery supported by the vehicle battery tray;
    a track fixed relative to the vehicle battery tray, the track being elongated along a cross-vehicle axis;
    a brace slideably engaged with the track, the brace being slidable along the track relative to the vehicle battery tray and the first and second frame rails along the cross-vehicle axis in a vehicle-outboard direction from an undeployed position to a deployed position; and
    a pyrotechnic actuator operatively coupled to the brace to slide the brace along the track from the undeployed position to the deployed position.

16. The vehicle of claim 15, wherein at least a portion of the brace is vehicle-inboard of one of the first frame rail and the second frame rail in the undeployed position and at least a portion of the brace is vehicle-outboard of the one of the first frame rail and the second frame rail in the deployed position.

17. The vehicle of claim 15, further comprising:
a second track fixed relative to the vehicle battery tray, the second track being spaced from the track and elongated along the cross-vehicle axis;
a second brace slidably engaged with the second track, the second brace being slidable along the second track relative to the vehicle battery tray and the first and second frame rails along the cross-vehicle axis from an undeployed position to a deployed position;
the second brace being slidable in a vehicle-outboard direction opposite from the brace; and
the brace is slidable toward one of the first frame rail and the second frame rail to the deployed position and the second brace is slidable toward the other of the first frame rail and the second frame rail.

18. The vehicle of claim 17, further comprising a computer including a processor and a memory storing instructions executable by the processor to:
detect certain vehicle impacts to a first vehicle side;
based on detection of a certain vehicle impact to the first vehicle side, slide the brace to the deployed position; and
based on sliding the brace to the deployed position, inflate an airbag supported by the brace to an inflated position.

19. The vehicle of claim 18, wherein the instructions include instructions to:
detect certain vehicle impacts to a second vehicle side;
based on detection of a certain vehicle impact to the second vehicle side, slide the second brace to the deployed position; and
based on sliding the second brace to the deployed position, inflate an airbag supported by the second brace to an inflated position.

20. The vehicle of claim 15, further comprising an airbag supported by the brace, the airbag being inflatable from an uninflated position to an inflated position, the airbag being in the uninflated position when the brace is in the undeployed position, and the airbag being in the inflated position when the brace is in the deployed position.

* * * * *